United States Patent Office 3,642,812
Patented Feb. 15, 1972

3,642,812
HALOGENOPHENYL-ISOXAZOLYL-ALKANOIC ACID DERIVATIVES
Peter Fulton Southern, Macclesfield, England, assignor to Imperial Chemical Industries Limited, London, England
No Drawing. Filed May 27, 1968, Ser. No. 732,034
Claims priority, application Great Britain, June 15, 1967, 27,731/67
Int. Cl. C07d 85/22
U.S. Cl. 260—307 H                5 Claims

ABSTRACT OF THE DISCLOSURE

This disclosure relates to halogenophenyl-isoxazole-alkanoic acids and derivatives which posses anti-inflammatory, analgesic and antipyretic activity. A representative of the compounds is 5-(4-chlorophenyl)isoxazol-3-yl-2-propionic acid.

---

This invention relates to heterocyclic compounds, and more particularly it relates to isoxazole derivatives which have anti-inflammatory, analgesic and antipyretic activity, to processes therefor, and to pharmaceutical compositions containing said derivatives.

According to the invention we provide isoxazole derivatives of the formula:

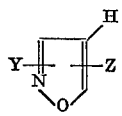

wherein Y stands for a monohalogenophenyl or dihalogenophenyl radical, and Z stands for a group of the formula —$CR^1R^2R^3$, wherein $R^1$ and $R^2$, which may be the same or different, stand for hydrogen or the methyl radical, and $R^3$ stands for a group of the formula —$CO_2R^4$ or —$CONHR^5$, wherein $R^4$ stands for hydrogen or an alkyl radical of not more than 6 carbon atoms, or the phenyl or benzyl radical, and $R^5$ stands for hydrogen or the amino (—$NH_2$) or hydroxy radical, and pharmaceutically-acceptable salts thereof.

It is to be understood that, in the isoxazole derivatives of this invention, when Y is linked to position 3 of the nucleus, Z is linked to position 5, and, when Z is linked to position 3 of the nucleus, Y is linked to position 5.

The halogen substituents(s) which is or are present in Y may be selected from fluorine, chlorine and bromine atoms.

As a suitable value for $R^4$ when it stands for an alkyl radical of not more than carbon atoms there may be mentioned, for example, the methyl, ethyl or n-butyl radical.

In the case where $R^3$ stands for the carboxy radical (—$CO_2H$), suitable salts are salts with alkali or alkaline earth metals, for example sodium or calcium salts, or aluminium or ammonium salts, or salts with pharmaceutically-acceptable organic bases.

Preferred compounds of this invention are 5-(4-chlorophenyl)isoxazol - 3 - yl - 2-propionic acid, 3-(2,4-dichlorophenyl)isoxazol - 5 - ylacetic acid, 3-(4-chlorophenyl)-isoxazol - 5 - yl - 2 - isobutyric acid and its ammonium, sodium, calcium or aluminium salt, and ethyl 3-(4-chlorophenyl)-isoxazol-5-yl-2-isobutyrate.

According to a further feature of the invention we provide a process for the manufacture of isoxazole derivatives of the formula:

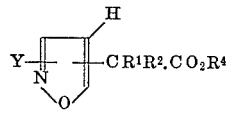

wherein Y, $R^1$ and $R^2$ have the meanings stated above, and $R^4$ stands for an alkyl radical of not more than 6 carbon atoms, which comprises reacting a compound of the formula:

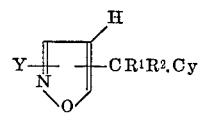

wherein Y, $R^1$ and $R^2$ have the meanings stated above, and Cy stands for the cyano (—CN) or carbamoyl (—$CONH_2$) radical, with a compound of the formula $R^4OH$, wherein $R^4$ has the meaning stated immediately above, under acidic conditions. The acidic conditions may be provided by the presence of an inorganic acid, for example sulphuric acid. A relatively small amount of water should be present. The reaction may be carried out in the presence of an organic solvent, for example benzene, and it may be accelerated or completed by the application of heat.

According to a further feature of the invention we provide a process for the manufacture of isoxazole derivatives of the formula:

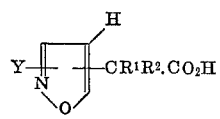

wherein Y, $R^1$ and $R^2$ have the meanings stated above, which comprises hydrolysing a compound of the formula:

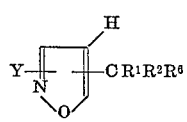

wherein Y, $R^1$ and $R^2$ have the meanings stated above, and $R^6$ stands for the cyano (—CN) or carbamoyl (—$CONH_2$) radical or the group —$CO_2R^7$ wherein $R^7$ stands for an alkyl, phenyl or benzyl radical. As a suitable alkyl radical there may be mentioned, for example, an alkyl radical of not more than 6 carbon atoms. As a suitable hydrolytic agent there may be mentioned, for example, an inorganic base, for example an alkali metal hydroxide, or an inorganic acid, for example sulphuric acid. The hydrolysis is carried out in the presence of water, and an organic solvent may optionally also be present. The reaction may be accelerated or completed by the application of heat.

According to a further feature of the invention we provide a process for the manufacture of isoxazole derivatives of the formula:

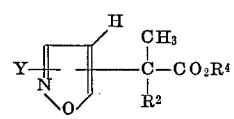

wherein Y and $R^2$ have the meanings stated above and $R^4$ stands for an alkyl radical of not more than 6 carbon atoms or the phenyl or benzyl radical, which comprises methylating a compound of the formula:

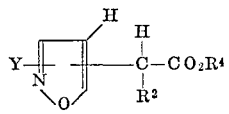

wherein Y and $R^2$ have the meanings stated above, and $R^4$ has the meaning stated immediately above. It will be readily understood that the methylation process can result in the introduction of one methyl radical or of two methyl radicals. The methylation may be carried out by the interaction of an alkali metal derivative, for example the sodium derivative of the appropriate isoxazole derivative with, for example, methyl iodide. The reaction may be carried out in a diluent or solvent, for example ether, or liquid ammonia, or a mixture thereof.

According to a further feature of the invention we provide a process for the manufacture of amides of the formula:

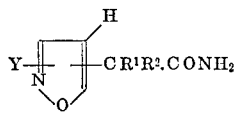

wherein Y, $R^1$ and $R^2$ have the meanings stated above, which comprises hydrolysing the corresponding nitrile. The hydrolysis is carried out in the presence of water, and as a suitable hydrolytic agent there may be mentioned, for example, an inorganic acid, for example sulphuric acid, or an inorganic base, for example an alkali metal hydroxide. The reaction may optionally be carried out in the presence of an organic solvent, for example ethanol, and it may optionally be accelerated or completed by the application of heat.

According to a further feature of the invention we provide a process for the manufacture of amides of the formula:

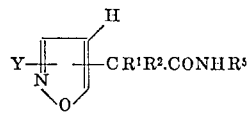

wherein Y, $R^1$, $R^2$ and $R^5$ have the meanings stated above, which comprises reacting a compound of the formula:

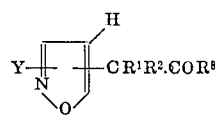

wherein Y, $R^1$ and $R^2$ have the meanings stated above, and $R^8$ stands for a halogen atom or an alkoxy, benzyloxy or phenoxy radical, or an acid anhydride corresponding to the compound wherein $R^8$ stands for a halogen atom, with a compound of the formula $NH_2R^5$ wherein $R^5$ has the meaning stated above, provided that, when $R^5$ stands for the amino radical, $R^8$ does not stand for a halogen atom. The reaction may be carried out in a diluent or solvent, for example water, and it may optionally be accelerated or completed by the application of heat.

According to a further feature of the invention we provide a process for the manufacture of esters of the formula:

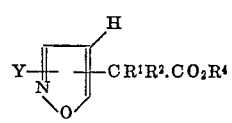

wherein Y, $R^1$ and $R^2$ have the meanings stated above, and $R^4$ stands for an alkyl radical of not more than 6 carbon atoms, or the phenyl or benzyl radical, which comprises esterifying the corresponding acid of the formula:

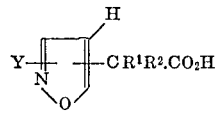

wherein Y, $R^1$ and $R^2$ have the meanings stated above, or an acid halide or anhydride thereof.

The esterification may be carried out by reacting the carboxylic acid with the compound of the formula $R^4OH$, wherein $R^4$ has the meaning stated immediately above, and an inorganic acid, for example sulphuric acid. Alternatively, the esterification may be carried out by reacting the carboxylic acid halide, for example the acid chloride, or the carboxylic acid anhydride, with the compound of the formula $R^4OH$, wherein $R^4$ has the meaning stated immediately above. In the case where an acid halide is used, an acid-binding agent, for example an alkali metal hydroxide or carbonate, may optionally be present. In the case where $R^4$ stands for the methyl or ethyl radical, the esterification may be carried out by reacting the carboxylic acid with diazomethane or diazoethane respectively.

It is to be understood that the starting materials used in the processes of this invention may be obtained by generally known procedures.

According to a further feature of this invention we provide pharmaceutical compositions comprising an isoxazole derivative of the formula:

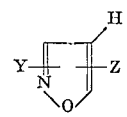

wherein Y and Z have the meanings stated above, or a pharmaceutically-acceptable salt thereof, and an inert pharmaceutically-acceptable diluent or carrier.

The pharmaceutical compositions may, for example, be in the form of tablets, pills, capsules, suppositiories, non-sterile aqueous or non-aqueous solutions or suspensions, sterile injectable aqueous or non-aqueous solutions or suspensions, creams, lotions, or ointments. These compositions may be obtained in conventional manner using conventional excipients. The compositions may optionally contain, in addition to the isoxazole derivative which characterises this invention, at least one known agent having anti-inflammatory and/or analgesic activity, for example aspirin, paracetamol, codeine, chloroquine, phenylbutazone, oxyphenbutazone, indomethacin, mefenamic acid, flufenamic acid, ibufenac, or an anti-inflammatory steroid, for example prednisolone. Those compositions intended for oral administration may, in addition, optionally contain at least one anti-cholinergic agent, for example homatropine methyl bromide, and/or an antacid, for example aluminium hydroxide. Those compositions designed for topical application may, in addition, optionally contain a vasodilating agent, for example tolazoline, or a vasoconstricting agent, for example adrenaline; a local anaesthetic, for example amethocaine, or a counter-irritant, for example capsicum; and/or at least one agent chosen from the following classes of substances: antibacterial agents, which includes sulphonamides and antibiotics having antibacterial action, for example neomycin; antifungal agents, for example hydroxyquinoline; antihistaminic agents, for example promethazine; rubefacient agents, for example methyl nicotinate; and uricosuric agents, for example probenecid.

The invention is illustrated but not limited by the following examples in which the parts are by weight:

EXAMPLE 1

A mixture of 5 parts of 3-(4-chlorophenyl)isoxazol-5-ylacetonitrile, 20 parts of ethanol, 18 parts of concentrated sulphuric acid, and 1 part of water is heated at about 90° C. for 10 hours. The solution is then poured into 200 parts of ice-water. The mixture is filtered, and the solid residue is crystallised from aqueous ethanol to give ethyl 3-(4-chlorophenyl)isoxazol-5-lyacetate, M.P. 93–94° C.

The nitrile used as starting material (M.P. 115–116° C.; crystallised from cyclohexane) may be obtained by means of a known general method.

EXAMPLE 2

A mixture of 1 part of ethyl 3-(4-chlorophenyl)isoxazol-5-ylacetate and 12 parts of N-sodium hydroxide solution is boiled for 10 minutes, and then cooled and acidified with concentrated hydrochloric acid. The resulting solid is filtered off and crystallised from aqueous ethanol to give 3-(4-chlorophenyl)isoxazol-5-ylacetic acid, M.P. 166–167° C.

EXAMPLE 3

1 part of sodium is added to 100 parts of stirred liquid ammonia containing a trace of ferric nitrate. When the formation of sodamide is complete (shown by a colour change from blue to grey), a suspension of 11.1 parts of ethyl 3-(4-chlorophenyl)isoxazol-5-ylacetate in 60 parts of ether is added, and the mixture is stirred at −70° C. for 30 minutes. A solution of 6 parts of methyl iodide in 30 parts of ether is added, and stirring at −70° C. is continued for 1½ hours. 2.5 parts of ammonium chloride are then added, and the ammonia is allowed to evaporate at room temperature. 200 parts of ether are added to the residue, and the resulting ethereal suspension is successively washed with sodium bicarbonate solution, sodium bisulphate solution, and water. The organic solution is dried (anhydrous sodium sulphate) and the solvent evaporated. The residual oil is separated by preparative-scale thin-layer chromatography on Kieselgel (Grade GF 254; available from Anderman and Co. Ltd.; distributors for E. Merck Lab. Chemicals), using cyclohexane-acetone (65:35 v./v.) as eluent, into ethyl 3-(4-chlorophenyl)isoxazol-5-ylacetate (starting material), ethyl 3-(4-chlorophenyl)isooxazole - 5 - yl-2-propionate, and ethyl 3 - (4-chlorophenyl)isoxazol-5-yl-2-isobutyrate. Hydrolysis of the second and third of these esters by the method described in Example 2 gives 3-(4-chlorophenyl)isoxazol-5-yl-2-propionic acid, M.P. 144–145° C., and 3-(4-chlorophenyl)isoxazol-5-yl-2-isobutyric acid, M.P. 177–178° C. (crystallised from 50% aqueous ethanol).

EXAMPLE 4

A mixture of 1 part of 5-(4-chlorophenyl)isoxazol-3-ylacetonitrile, 1 part of potassium hydroxide, 2 parts of water, and 12 parts of methanol is refluxed for 3 hours. The mixture is cooled, 120 parts of water and 60 parts of chloroform are added, and the resulting mixture is well shaken. The mixture is then filtered, and the aqueous phase is separated from the filtrate. The aqueous phase is acidified with concentrated hydrochloric acid, and the resulting mixture is filtered to give, as solid residue, 5-(4-chlorophenyl)isoxazol-3-ylacetic acid, M.P. 164–165° C. (crystallisation from 50% aqueous ethanol).

The nitrile used as starting material (M.P. 150–152° C.) may be obtained in known general manner from the corresponding 3-chloromethyl compound.

In a similar manner, using the appropriate starting materials the following compounds are obtained:

3-(4-bromophenyl)isoxazol-5-ylacetic acid, M.P. 158–159° C.;
3-(4-fluorophenyl)isoxazol-5-ylacetic acid, M.P. 150–151° C.;
3-(2,4-dichlorophenyl)isoxazol-5-ylacetic acid, M.P. 125–126° C.;
3-(4-chlorophenyl)isoxazol-5-yl-2-isobutyric acid, M.P. 177–178° C.;
3-(4-bromophenyl)isoxazol-5-yl-2-isobutyric acid, M.P. 182–183° C.;
3-(4-fluorophenyl)isoxazol-5-yl-2-isobutyric acid, M.P. 170–171° C.; and
5-(4-chlorophenyl)isoxazol-3-yl-2-isobutyric acid, M.P. 167.5–169° C.

EXAMPLE 5

The process described in Example 1 is repeated, replacing the 3-(4-chlorophenyl)isoxazol-5-ylacetonitrile by the appropriate nitrile, and in a similar manner the following compounds are obtained as oils:

ethyl 3-(2,4-dichlorophenyl)isoxazol-5-ylacetate, N.M.R. spectrum ($\tau$ values) s. 6.1., t. 8.7, p. 5.75;
ethyl 3-(4-chlorophenyl)isoxazol-5-yl-2-isobutyrate, N.M.R. spectrum ($\tau$ values) s. 8.33, t. 8.8, q. 5.73;
methyl 3-(4-chlorophenyl)isoxazol - 5 - ylacetate) corresponding acid, M.P. 166–167° C., obtained by hydrolysis with aqueous sodium hydroxide, see Example 2); and
methyl 3 - (2,4 - dichlorophenyl)isoxazol - 5 - ylacetate, N.M.R. spectrum ($\tau$ values), s. 6.25, s. 6.08. (s=singlet; t.=triplet; q.=quartet).

EXAMPLE 6

The process described in Example 1 is repeated except that the 3-(4-chlorophenyl)isoxazol-5-ylacetonitrile is replaced by 3 - (4 - chlorophenyl)isoxazol-5-yl-2-isobutyramide. In a similar manner there is obtained ethyl 3-(4-chlorophenyl)isoxazol-5-yl-2 - isobutyrate, N.M.R. spectrum ($\tau$ values), s. 8.33, t. 8.8., q. 5.73.

EXAMPLE 7

The process described in Example 3 is repeated except that the ethyl 3-(4-chlorophenyl)isoxazol-5-ylacetate is replaced by ethyl 3-(2,4-dichlorophenyl)isoxazole-5-ylacetate. In a similar manner there is obtained ethyl 3-(2,4-dichlorophenyl)isoxazol-5-yl-2-isobutyrate, N.M.R. spectrum ($\tau$ values), s. 8.33, q. 5.78, t. 8.75.

EXAMPLE 8

Hydrolysis of ethyl 3-(2,4-dichlorophenyl)isoxazol-5-yl-2-isobutyrate by the method described in Example 2 gives 3-(2,-4-dichlorophenyl)isoxazol-5-yl - 2 - isobutyric acid, M.P. 109–110° C.

EXAMPLE 9

The method described in Example 4 is repeated, except that the 5-(4-chlorophenyl)isoxazol-3-ylacetonitrile is replaced by the appropriate nitrile, and in similar manner there are obtained:

3-(2,3-dichlorophenyl)isoxazol-5-ylacetic acid, M.P. 138–140° C.;
3-(2 - chlorophenyl)isoxazol-5-ylacetic acid, M.P. 100–102° C.; and
5-(4 - chlorophenyl)isoxazol-3-yl-2-propionic acid, M.P. 139–141° C.

EXAMPLE 10

1 part of 3-(4-chlorophenyl)isoxazol-5-yl-acetonitrile is dissolved in 5 parts of concentrated sulphuric acid. After 2 days at room temperature, the mixture is poured into water. The resulting solid is filtered off and crystallised from methanol to give 3-(4-chlorophenyl)isoxazol-5-ylacetamide, M.P. 191–192° C.

In a similar manner 3-(4-chlorophenyl)isoxazol-5-yl-2-isobutyramide, M.P. 195–196° C. (decomposition), and 3-(2,4-dichlorophenyl)isoxazol-5-ylacetamide, M.P. 141–142° C., are obtained from the corresponding nitriles.

EXAMPLE 11

1 part of 3-(4-chlorophenyl)isoxazol-5-yl-2-isobutyric acid is dissolved in 10 parts of aqueous ammonium hydroxide (specific gravity 0.880). The solution is evaporated to dryness and the residual solid is washed with ether to give ammonium 3-(4-chlorophenyl)isoxazol-5-yl- 2-isobutyrate monohyrate, M.P. 168–169° C. (decomposition).

1 part of 3-(4-chlorophenyl)isoxazol-5-yl-2-isobutyric acid, 1.6 parts of N-sodium hydroxide solution and 5 parts of water are mixed, the mixture is filtered and the filtrate is evaporated to dryness. The residual solid is crystallised from a mixture of ethanol and ether. There is thus obtained sodium 3-(4-chlorophenyl)isoxazol - 5 - yl-2-isobutyrate dihydrate, M.P. 270° C. (decomposition).

8 parts of calcium chloride hexahydrate in solution in 300 parts of water are added to a solution of 23 parts of sodium 3-(4-chlorophenyl)isoxazol-5-yl-2-isobutyrate in 500 parts of water. The calcium salt of 3-(4-chlorophenyl) isoxazol-5-yl-2-isobutyric acid is precipitated and is collected by filtration, washed well with water and dried in vacuo at room temperature, M.P. over 200° C.

Replacement of the calcium chloride hexahydrate in the above experiment with 9 parts of aluminum nitrate monohydrate gives the aluminum salt of 3-(4-chlorophenyl)-isoxazol-5-yl-2-isobutyric acid, M.P. over 200° C.

EXAMPLE 12

1 part of 3-(4-chlorophenyl)isoxazol-5-yl-2-isobutyryl chloride is added slowly to 10 parts of ammonium hydroxide (specific gravity 0.880) at 0° to 10° C. 20 parts of water are added and the mixture is filtered. There is thus obtained 3-(4-chlorophenyl)isoxazol-5-yl-2-isobutyramide, M.P. 190–191° C.

EXAMPLE 13

1 part of 3-(4-chlorophenyl)isoxazol-5-yl-2-isobutyryl chloride and 3 parts of dry ethanol are refluxed together for 30 minutes. The mixture is evaporated in vacuo to dryness, giving ethyl 3-(4-chlorophenyl)-isoxazol-5-yl-2-isobutyrate, N.M.R. spectrum ($\tau$ values), s. 8.33, t. 8.8, q. 5.73.

Similarly, using n-butanol in place of ethanol, there is obtained n-butyl 3 - (4-chlorophenyl)isoxazol-5-yl-2-isobutyrate, N.M.R. spectrum ($\tau$ values), s. 8.33, t. 5.88, and a complexity of peaks at 8.25 to 9.25.

EXAMPLE 14

4 parts of 3-(4-chlorophenyl)isoxazol-5-yl-2-isobutyric acid and 1 part of diazomethane in ether are mixed at 0° C., and stood at room temperature until evolution of nitrogen ceases. Evaporation to dryness yields methyl 3-(4-chlorophenyl)isoxazol-5-yl-2 - isobutyrate, N.M.R. spectrum ($\tau$ values), s. 8.33 and 6.28.

EXAMPLE 15

1 part of 3-(4-chlorophenyl)isoxazol-5-yl-2-isobutyryl chloride is added dropwise with vigorous agitation to a solution of 1 part of phenol in 10 parts of 10% aqueous sodium hydroxide. After 2 hours, the solid is filtered off and crystallised from aqueous ethanol to give phenyl 3-(4-chlorophenyl)isoxazol-5-yl-2-isobutyrate, M.P. 105–106° C.

EXAMPLE 16

1 part of 3-(4-chlorophenyl)isoxazol-5-yl-2-isobutyric acid, 1.3 part of benzenesulphonyl chloride, and 50 parts of dry pyridine are mixed and stirred at 0° C. for 1 hour. There is thus obtained a solution comprising 3-(4-chlorophenyl)isoxazol-5-yl-2-isobutyric acid anhydride (M.P. 112–114° C.) in pyridine. 0.5 part of benzyl alcohol is added to this solution, and the mixture is stirred at room temperature for 24 hours. The mixture is poured into water, the resulting mixture is filtered, and the solid residue is crystallised from aqueous ethanol. There is thus obtained benzyl 3-(4-chlorophenyl)isoxazol - 5 - yl-2-isobutyrate, M.P. 72–73° C.

EXAMPLE 17

1 part of methyl 3-(2,4-dichlorophenyl)isoxazol-5-yl-acetate and 10 parts of aqueous ammonium hydroxide (specific gravity 0.880) are stirred together at room temperature for 3 days. 30 parts of water are then added, the mixture is filtered, and the solid residue is crystallised from benzene. There is thus obtained 3-(2,4-dichlorophenyl)isoxazol-5-ylacetamide, M.P. 141–142° C.

EXAMPLE 18

10 parts of methyl 3 - (2,4-dichlorophenyl)-isoxazol-5-ylacetate are added over 15 minutes to 3 parts of hydrazine hydrate. After heating on a steam bath for 8 hours, the solid is collected by filtration, washed with water, and then crystallised from 80 parts of ethanol to give 3 - (2,4 - dichlorophenyl)isoxazole-5-ylacethydrazide, M.P. 147.5–148° C.

EXAMPLE 19

0.15 part of sodium is dissolved in 16 parts of dry methanol. 0.25 part of hydroxylamine hydrochloride and 1 part of methyl 3 - (2,4 - dichlorophenyl)isoxazole-5-ylacetate are added to the solution. The mixture is kept at room temperature for 24 hours. 50 parts of water are added, and the resulting mixture is filtered to give 3 - (2,4 - dichlorophenyl)isoxazol - 5 - ylacethydroxamic acid, M.P. 160–161° C.

EXAMPLE 20

A mixture of 100 parts of 5-(4-chlorophenyl)isoxazol-3-yl-2-propionic acid and 300 parts of maize starch is granulated with a sufficient quantity of 10% w./v. starch paste. The granules are passed through a 20-mesh screen and are dried at a temperature not exceeding 50° C. The dried granules are blended into 4 parts of magnesium stearate, and compressed into tablets which may contain from 50 to 250 mg. of active ingredient. There are thus obtained tablets suitable for oral use for therapeutic purposes.

Instead of 100 parts of 5-(4-chlorophenyl)isoxazol-3-yl-2-propionic acid there may be used 100 parts of 3 - (2,4 - dichlorophenyl)isoxazol-5-ylacetic acid or 3-(4-chlorophenyl)isoxazol-5-yl-2-isobutyric acid.

EXAMPLE 21

50 parts of micronised 3-(2,4-dichlorophenyl)isoxazol-5-ylacetic acid are mixed with 130 parts of lactose and 35 parts of 10% w./v. aqueous gelatine solution, and the mixture is granulated. 24.5 parts of maize starch are mixed with the granules, and 2 parts of magnesium stearate are then added. The mixture is compressed into tablets containing 50 mg. of active ingredient. There are thus obtained tablets which are suitable for oral administration for therapeutic purposes.

EXAMPLE 22

5 parts of 3-(4-chlorophenyl)isoxazol-5-yl-2-isobutyric acid are added to a stirred mixture of 9 parts of liquid paraffin and 86 parts of white soft paraffin heated at 65° C. Stirring is continued until the mixture is cool, and there is thus obtained an ointment suitable for topical application for therapeutic purposes.

The isoxazole derivatives of this invention are active in the following procedure which is standard in the art for testing for anti-inflammatory activity (Newbold, Brit. J. Pharmacol. Chemotherap., 1963, 21, 127–136).

Adjuvant induced arthritis in rats

When 0.05 ml. of a fine suspension containing 5 mg./ml. of dead tubercle bacilli in liquid paraffin is injected into the foot-pad of a rat, a primary swelling is produced. This swelling increases in size for three days, and then diminishes slightly until the seventh day, when further swelling occurs. Ten days after the injection, inflamed lesions (which are called secondary lesions) appear in areas of the body which are remote from the actual site of injection; particularly on the joints of the fore-paws, hind-paws and tail. Little further swelling of the feet or joints occurs after the thirteenth day (after the injection). These secondary lesions are considered to have arisen as a result of an immunological reaction involving constituents of the dead tubercle bacilli which became disseminated after injection.

The isoxazole derivatives of this invention have been tested for anti-inflammatory properties as follows:

Each rat in a group of 3 male rats (average weight ca. 200 g.) was dosed orally with the test compound (as an aqueous suspension), and, on the day after dosing, an injection of dead tubercle bacilli was given as above. There as one control group of 3 rats (which received dead tubercle bacilli but no test compound) for every 5 groups of rats receiving test compounds. The test compound was then dosed orally each day until the thirteenth day after the injection of the dead tubercle bacilli. The thickness of the injected foot was measured 3 days after injection and 13 days after injection. The results were expressed as the percentage inhibition of the increase in thickness of the injected feet of the treated rats. The results obtained with a representative selection of the said isoxazole derivatives are shown in the following table (in the cases where the word "Toxic" appears, all the rats died before the thirteenth day after the injection.

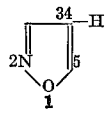

| Substituent at position 3 | Substituent at position 5 | Dose, mg./kg. | Percent inhibition Day 13 | Day 3 |
|---|---|---|---|---|
| 4.Cl.Phenyl | CH₂.COOH | 100 | 62 | 32 |
| 4.Cl.Phenyl | CH(Me).COOH | 10 | 45 | 46 |
|  |  | 25 | 65 | 39 |
|  |  | 50 | 58 | 50 |
| 4.Cl.Phenyl | CMe₂.COOH | 38 | 48 | 33 |
|  |  | 100 | 74 | 18 |
| 4.Cl.Phenyl | CH₂.CONH₂ | 50 | 57 | 38 |
| 4.Br.Phenyl | CH₂.COOH | 50 | 53 | 29 |
| 4.Br.Phenyl | CMe₂.COOH | 100 | 52 | 44 |
| 4.F.Phenyl | CH₂.COOH | 50 | 27 | −2 |
| 4.F.Phenyl | CMe₂.COOH | 100 | 47 | 48 |
| 2,4.diCl.Phenyl | CH₂.COOH | 50 | 62 | 49 |
|  |  | 25 | 56 | 25 |
|  |  | 10 | 43 | 29 |
| CH₂.COOH | 4.Cl.Phenyl | 100 | 59 | 55 |
|  |  | 50 | 51 | 36 |
| CH(Me).COOH | 4.Cl.Phenyl | 100 | Toxic |  |
|  |  | 50 | do |  |
|  |  | 25 | 60 | 47 |
|  |  | 10 | 57 | 27 |
| CMe₂.COOH | 4.Cl.Phenyl | 100 | 51 | 27 |
|  |  | 25 | 42 | 24 |
| CH(Me).COOH | 4.Cl.Phenyl | 5 | 40 | 43 |
| 2.Cl.Phenyl | CH₂.COOH | 50 | 38 | 19 |
| 2,4.di.Cl.Phenyl | CH₂.COOMe | 50 | 44 | 36 |
| 4.Cl.Phenyl | CMe₂.COOEt | 50 | 53 | 43 |
| 4.Cl.Phenyl | CMe₂.COOBu(n) | 50 | 51 | 44 |
| 2,4.di.Cl.Phenyl | CMe₂.COOH | 10 | 51 | 12 |
| 4.Cl.Phenyl | CMe₂.CONH₂ | 50 | 55 | 40 |
| 4.Cl.Phenyl | CMe₂.COOMe | 40 | 43 | 38 |
| 4.Cl.Phenyl | CMe₂.COOCH₂Ph | 50 | 55 | 43 |
| 4.Cl.Phenyl | CMe₂.COOPh | 50 | 52 | 42 |
| 2,4.Cl₂.Phenyl | CH₂CONH₂ | 50 | 59 | 39 |
| 2,4.Cl₂.Phenyl | CH₂CONHNH₂ | 50 | 50 | 41 |

The above results prove that the compounds in question exhibit anti-inflammatory activity in the rat, inasmuch as the compounds partially prevent the development of inflammation on Day 3 and Day 13. Moreover, toxicity data indicates that the compounds are not undesirably toxic at useful dosage levels.

It is well known and accepted in the art that nonsteroidal anti-inflammatory compounds exhibit analgesic and antipyretic activity. The compounds of this invention are nonsteroidal and they exhibit anti-inflammatory activity, as evidenced by the above results. Accordingly, it is reasonable to conclude that the isoxazole derivatives of this invention possess analgesic and antipyretic activity.

The compounds of the invention are generically useful in the treatment of warm-blooded animals (including mammals) and, for this purpose, we recommend that said compounds be administered orally, for example in tablet or capsule form, and that the daily dosage be in the range of about 2 mg. to 50 mg. per kg. of host. In particular, when one of the said compounds is used in the treatment of man, we recommend that it be administered orally, for example in tablet or capsule form, at a total daily dose of 100 mg. to 3,000 mg. of said compound per 70 kg. man.

What we claim is:

1. A compound selected from the group consisting of isoxazole derivatives of the formula:

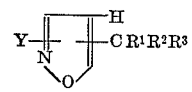

wherein:

Y is a member selected from the group consisting of monohalogenophenyl and dihalogenophenyl;

$R^1$ and $R^2$ are members selected from the group consisting of hydrogen and methyl; and $R^3$ is a member selected from the group consisting of $-CO_2R^4$ and $-CONHR^5$; wherein $R^4$ is a member selected from the group consisting of hydrogen, alkyl of not more than 6 carbon atoms, phenyl and benzyl; and $R^5$ is a member selected from the group consisting of hydrogen, amino and hydroxy;

and pharmaceutically-acceptable salts thereof.

2. A compound as claimed in claim 1 which is 5-(4-chlorophenyl)isoxazol-3-yl-2-propionic acid.

3. A compound as claimed in claim 1 which is 3-(2,4-dichlorophenyl)isoxazol-5-ylacetic acid.

4. A compound as claimed in claim 1 which is a member selected from the group consisting of 3-(4-chlorophenyl)isoxazol-5-yl-2-isobutyric acid and its ammonium, sodium, calcium and aluminium salts.

5. A compound as claimed in claim 1 which is ethyl 3-(4-chlorophenyl)isoxazol-5-yl-2-isobutyrate.

6. As a pharmaceutical composition of matter, a compound in claim 1 in admixture with a major amount of an inert, pharmaceutically-acceptable diluent.

References Cited

UNITED STATES PATENTS 3,239,533   3/1966   Kano et al. _____ 260—307

ALEX MAZEL, Primary Examiner

R. V. RUSH, Assistant Examiner

U.S. Cl. X.R.

424—272